Aug. 22, 1933.  E. R. C. COE ET AL  1,923,708
CIRCUIT INTERRUPTER
Original Filed Dec. 23, 1930
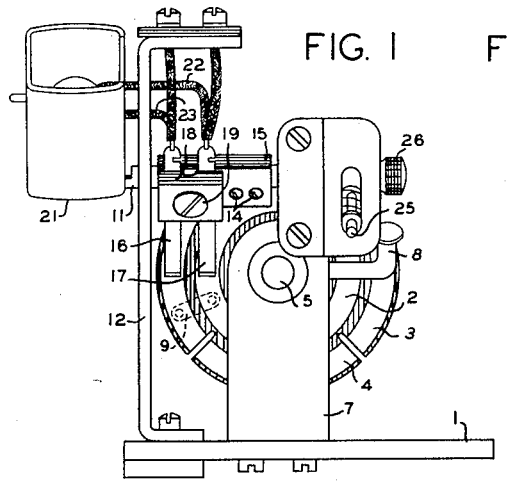
FIG. 1
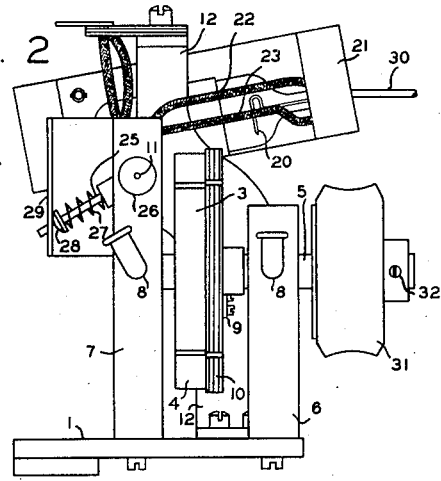
FIG. 2
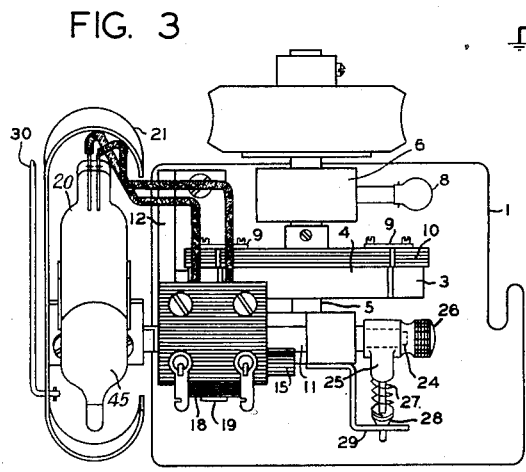
FIG. 3
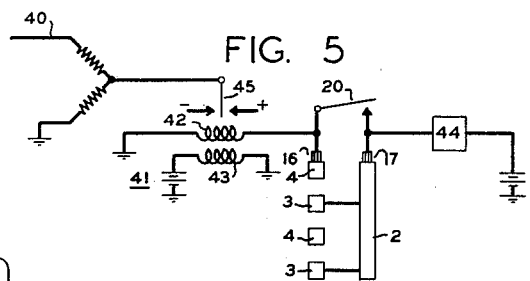
FIG. 5
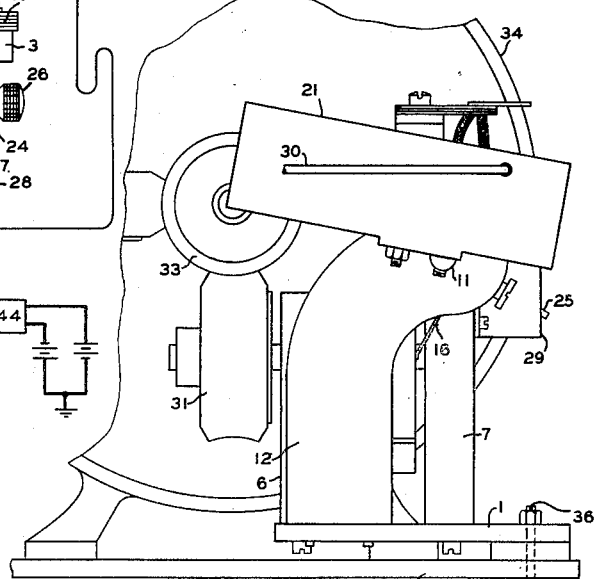
FIG. 4
FIG. 6
INVENTORS
ERIC R. C. COE
WILLIAM F. CASSEDY, JR.
BY R C Hopgood
ATTORNEY Patented Aug. 22, 1933

1,923,708

UNITED STATES PATENT OFFICE 1,923,708

CIRCUIT INTERRUPTER

Eric R. C. Coe, Summit, and William F. Cassedy, Jr., Milburn, N. J., assignors to International Communications Laboratories, Inc., Newark, N. J., a Corporation of New York Original application December 23, 1930, Serial No. 504,280. Divided and this application October 31, 1931. Serial No. 572,340

3 Claims. (Cl. 200—24)

This invention relates to duplex telegraph systems, and more particularly to a device for sending suitable signals thereover for line balancing.

This application is a division of our application Serial No. 504,280 filed December 23, 1930.

As is well known in the art, these signals have heretofore been obtained by operating a hand key to send impulses to the line to aid in obtaining a balance, said impulses being either alternately positive and negative, or else of one polarity followed by an interval of no current. A more recent method is that of causing a transmitting relay, under the control of a vibrating relay, to send the impulses to the line.

It is well understood by those versed in the art, that for ease in obtaining a closer balance, the impulses sent to line should be equal in duration, and further that the duration of a single impulse should be equal to that of the shortest signal sent out under operating conditions.

The methods mentioned above have been found unsatisfactory in view of the speed at which duplex systems are now operated, and due to the varying length of the impulses sent out.

For the sake of brevity, and in conformity with current nomenclature in the telegraph art, such impulses will be referred to hereinafter as alternating current or a. c., it being understood that when such reference is made it may mean either alternate positive and negative impulses of equal duration, or impulses of one polarity alternating with no current intervals equal in duration to the current impulses.

The principal object of this invention therefore, is to provide a device which may be attached to a sending mechanism such as a tape transmitter, a keyboard transmitter, or a printer embodying a transmitter, for transmitting a. c. for balancing purposes.

A further object of this invention is to provide a mechanism which will transmit alternating current impulses of unvarying length for balancing purposes.

A further object is to provide a device which may be easily cut in and out of the circuit by some convenient means.

A further object is to provide a switch actively connected to the brushes of the device which will connect the line or local circuit through the device when the latter is placed in operation and which will short circuit the device when the latter is rendered inoperative.

A clearer conception of the operation, construction and further objects of the invention may be had from the following specification taken in conjunction with the accompanying drawing in which:

Figure 1 discloses a front view of the device;
Figure 2 is an end view of Figure 1;
Figure 3 is a top view of Figure 1;
Figure 4 discloses the device secured to a printer;
Figure 5 is a schematic view of the device in use in a duplex telegraph circuit;
Figure 6 is a schematic view of a modified device in use in a duplex telegraph circuit.

The device comprises a base 1 on which is rotatably mounted a commutator comprising an inner solid ring 2 and an outer ring consisting of segments 3 and 4 secured to a bakelite disc 10. Segments 3 of the outer ring are strapped to ring 2 by straps 9.

The commutator is secured to a shaft 5 journaled in two upright arms 6 and 7 secured to the base. Oil cups 8 are provided for lubricating the shaft bearings. Arm 7 is provided with a portion extending above arm 6 to provide a bearing for one end of a small shaft 11. The other end of said shaft extends through an arm 12 formed as shown in Figures 1 and 4. Secured to shaft 11 by screws 14 is a brush carriage 15 carrying brushes 16 and 17 which are secured to the carriage 15 by a block 18 and screw 19.

Secured to the extreme end of shaft 11 is a holder for a mercury switch 20 enclosed by a guard 21. The mercury switch is of any well-known type having two electrodes which are connected to the brushes 16 and 17 by conductors 22 and 23. The other end of shaft 11 is reduced as shown at 24 in Figure 3 to accommodate an arm 25 which is held in adjusted relation with the shaft by a thumb nut 26.

The arm 25 carries a spring 27 and a washer 28 which co-operate with a bracket 29 to form a positioning device and stop for the shaft 11, brushes 16 and 17 and switch 20. Secured to the switch guard 21 as shown in Figures 3 and 4 is a rod 30 which is adapted to move the brushes 16 and 17 in and out of contact with the commutator and also tip the mercury switch.

A gear 31 is secured to the end of shaft 5 by a set screw 32. This gear is adapted to mesh with a worm 33 secured to the drive shaft of the printer. As long as the printer is in operation, the commutator is rotated, but a. c. is sent out on the line only when the brushes are brought into contact with the commutator through the movement of rod 30.

The preferred form of the device as shown in Figure 4 is adapted to be secured to the base 35 of the printer or tape transmitter, the existing bolts such as 36 being used for fastening. The gear 31 meshes with the worm 33 which is driven by the printer motor 34.

Figure 5 is a schematic showing of the device as used in a duplex telegraph circuit in which 40 designates the line and 41 is a polarized relay having two windings, namely, an operating winding 42 and a biasing winding 43. The square 44 designates the transmitting apparatus. Like numerals have been used for like parts of the device, namely 3 and 4 for the commutator segments, 16 and 17 for the brushes, and 20 for the mercury switch.

When the operator desires to transmit a. c. to obtain a balance, the rod 30 is manipulated, moving the brushes 16 and 17 into contact with the commutator and tipping the mercury switch 20 to the position in which the mercury is out of contact with the electrodes. Positive battery from the transmitter 44 passes through brush 17, solid ring 2, segments 3, brush 16 to ground through the winding 42 of relay 41, thereby moving the armature 45 to the left and sending negative current out over line 40. When the brush 16 reaches segment 4 which is not strapped to solid ring 3, the circuit through winding 42 is opened and the biasing winding 43 moves the armature to the right, thus connecting positive current to the line. The armature of relay 41 therefore changes position each time that brush 16 passes from a live segment 3 to a dead segment 4 or vice versa, thereby causing a. c. to be transmitted to line at a frequency controlled by the rate of rotation of the commutator.

With the switch 20 in the position of Figure 2, the mercury 45 (Fig. 3) is lodged in the left hand end of the tube away from the electrodes. However, when the brushes 16 and 17 are moved out of contact with the commutator, the switch is tipped in the opposite direction and the mercury moves to the right end of the tube into contact with the electrodes, thereby closing the signalling circuit from transmitter 44 to line relay 41 and short-circuiting the brushes.

It is apparent from the above that this device provides an easily operated and simple means for providing a. c. for balancing. It will also be apparent that without in any way changing the intention or application of the device, it may be provided with a third brush 50 as shown in Figure 6, bearing on an additional solid ring 51 which is connected to the segments 4.

By connecting line 40 to brush 16, positive battery to brush 17 and negative battery to brush 50 the device may be used to send a. c. direct to line without the intervention of the transmitting relay. In such case the mercury switch 20 would connect the line to transmitter 44 when the brushes were moved out of engagement with the commutator.

What is claimed is:

1. In a circuit interrupter, a continuously rotated commutator, a plurality of brushes adapted to be moved into and out of contact with said commutator and a mercury switch adapted to automatically short-circuit said brushes when moved out of contact with said commutator.

2. A circuit interrupter comprising a base, a commutator rotatably mounted on said base, a plurality of brushes associated with said commutator, said brushes being secured to a shaft, a switch secured to said shaft and means for causing said shaft to oscillate.

3. A circuit interrupter comprising a rotatable commutator and a shaft therefor, a plurality of brushes associated with said commutator, a switch secured to said shaft, and means controlled by said switch for dis-associating said brushes from said commutator and for short circuiting said brushes.

WILLIAM F. CASSEDY, Jr.
ERIC R. C. COE.